United States Patent Office 3,323,692
Patented June 6, 1967

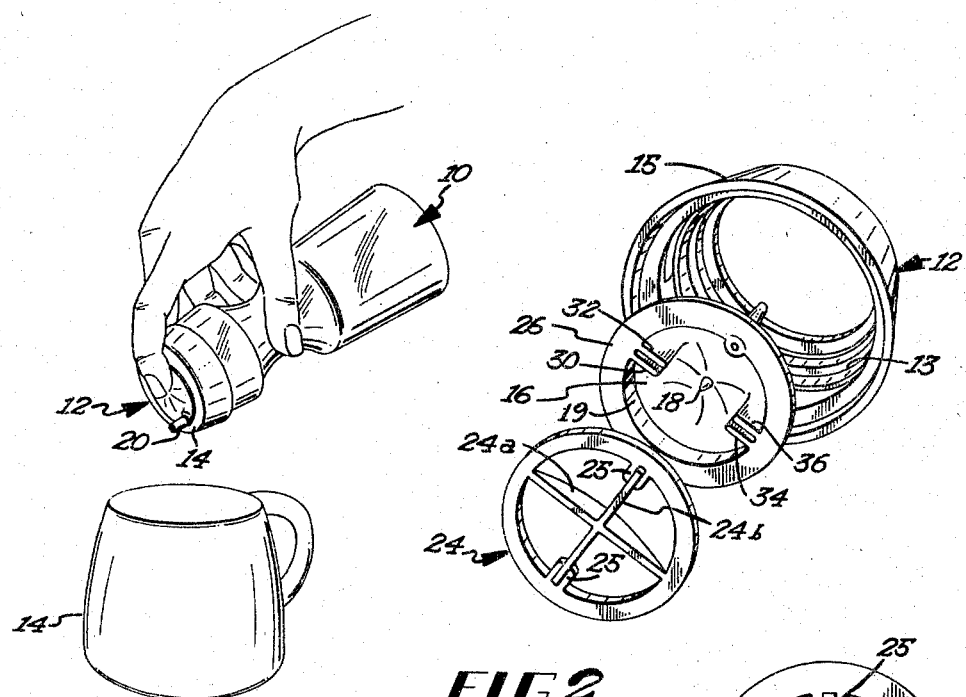
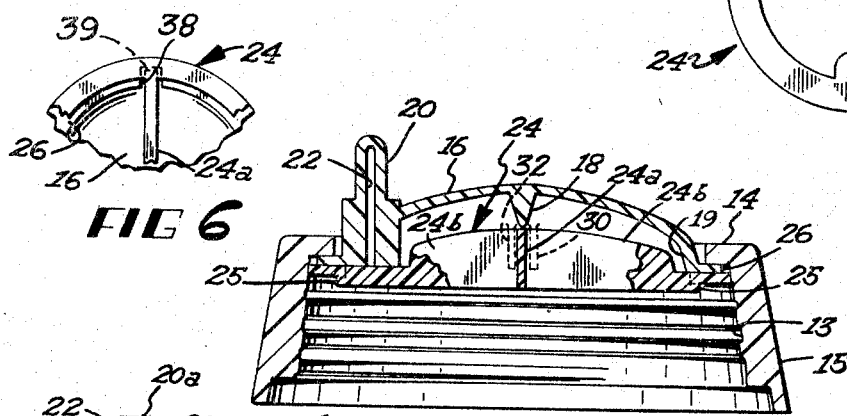
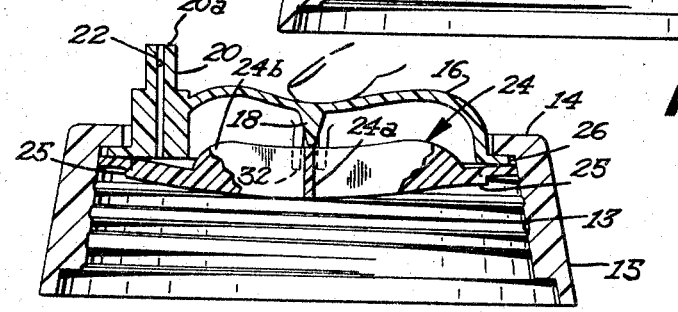

1

3,323,692
DROP DISPENSING CONTAINER
Marvin E. Cook, New Brighton, Minn., assignor to The Pillsbury Company, Minneapolis, Minn., a corporation of Delaware
Filed Oct. 22, 1965, Ser. No. 501,584
6 Claims. (Cl. 222—422)

The present invention relates to dispensing containers and more particularly to a container dispensing a liquid in quantities of from one to several drops at one time.

A variety of liquid dispensing containers have been previously proposed. Many of these containers have been to some extent ineffective in operation or their cost has been prohibitive.

One problem encountered in containers of the type described is that small quantities of liquid can become trapped in the dispensing cap. This trapped liquid has a tendency to bubble out of the nozzle when the temperature of the air in the container is raised and is particularly objectionable when the container is used for storing and dispensing a liquid containing dissolved solids such as an artificial sweetener since the dissolved solids form an unsightly deposit around the nozzle.

Another shortcoming encountered in the prior art is the tendency for these dispensing containers to expel a surge of liquid from the dispensing nozzle when inverted.

In view of these and other deficiences of the prior art, it is a primary objective of the invention to provide an improvement in drop dispensing containers for liquids which can be used to reliably expel a desired amount of a liquid and which is rugged in construction and can be manufactured at a relatively low cost.

Another object of the invention is the provision of a dispensing container of the type described wherein the liquid bubbling from the dispensing nozzle due to changes in ambient temperature will be minimized or prevented.

A still further object of the invention is the provision of an improvement in dispensing containers of the type described wherein the flow of liquid from the container is quickly interrupted when manual pressure applied to a movable flow element is released.

A still further object of the invention is the provision of an improvement in a drop dispensing container of the type described which will dispense material reliably even when a change in barometric pressure has produced a partial vacuum within the container.

A still further object of the invention is that the container presents an attractive visual appearance and can be easily cleaned.

These and other more detailed and specific objects will be apparent in view of the accompanying specification and attached drawings wherein:

FIGURE 1 is a perspective view of a preferred form of the invention as it appears when used for dispensing drops of a liquid sweetener into a coffee cup.

FIGURE 2 is an exploded view of the dispensing cap of the container on an enlarged scale relative to FIGURE 1.

FIGURE 3 is a view of the surface of the flow control element as seen from below on a slightly larger scale than FIGURE 2.

FIGURE 4 is a central vertical sectional view of the dispensing cap in accordance with the invention on a larger scale than FIGURES 1–3.

FIGURE 5 is a view similar to FIGURE 4 with the parts in the positions occupied when material is being dispensed.

FIGURE 6 is a partial plan view of the closure as seen from below according to a modified form of the invention.

Briefly stated, the present invention provides a drop dispensing container including a container body which in its preferred form is a glass bottle. The bottle is secured as by threads to a dispensing assembly. The dispensing assembly includes a manually movable flow control element or diaphragm which assumes a first or rest position. The assembly also includes a valve member and a dispensing duct communicating with the interior of the container body. The flow control element is operatively associated with the valve member for moving the valve member from a position sealing the duct when the control element is in a first position to a second position wherein the valve member is spaced from the duct. A resilient means is also associated with the valve means for returning it to its seated position sealing the duct when the control element is returned to its first position by a resilient means.

To the accomplishment of the foregoing and related ends, this invention then comprises the features hereinafter fully described and particularly pointed out in the claims, the following description setting forth in detail certain illustrative embodiments of the invention, these being indicative, however of but a few of the various ways in which the principles of the invention may be employed.

Refer now to the figures which illustrate by way of example a preferred form of the invention. As can be clearly seen in FIGURE 1 there is provided a dispensing container 10 which in this instance comprises a glass jar having a cap 12. The cap 12 includes a retaining ring or sleeve member 15 having internal threads 13 for securing it to the glass container 10. The glass container 10 is provided with threads at its upper or top end (not shown) adapted to mate with threads 13. The upper end of the container 10 terminates in a typical opening defined by a rim (not shown). The retaining sleeve 15 also includes a centrally or inwardly extending circular flange 14 at its upward end. Mounted below the flange 14 is a manually movable dispensing control element or diaphragm 16 having a generally dome-shaped or outwardly convex central portion including a downwardly extending projection 18 at its center for purposes hereinafter described. The central portion has a depending skirt 19 terminating in a horizontally disposed laterally and outwardly extending circular flange 26. The element 16 also includes a dispensing nozzle 20 which is closed at the free end when shipped as seen in FIGURE 4 and is opened by cutting the outward end off with a knife or scissors to expose a central dispensing duct 22 which at times communicates with the interior of the container 10 when the device is in use. The inner end of the nozzle and duct terminate adjacent the open end of the container.

Mounted below the diaphragm 16 is a valve member 24 which is generally ring-shaped in configuration and includes two integral mutually perpendicular vertically disposed cross pieces or flanges 24a and 24b that intersect at a point immediately below the projection 18. A pair of centrally extending integral tabs 25 are provided for reinforcing the connection between the outward ends of the brace 24b and the ring portion of the valve 24. The flange 26 is positioned immediately above and abutting against the upward surface of the ring portion of the valve 24. The upward edge of the bottle 10 forces the upward edge of the valve member 24 and the flange 26 firmly against the lower surface of the flange 14 thereby securely sealing the container 10 against leakage when the cap is screwed tightly against the top of the container 10. A small sealing bead (not shown) can be provided on the upper or lower surface of the flange 14 to further reduce leakage. Both the valve member 24 and the element 16 are formed from a suitable resilient material such as a synthetic resin, for example, polyethylene.

As can be clearly seen in FIGURE 4 which illustrates the normal resting position of the parts, the upper flat surface of a portion of the brace 25 at the left end of the member 24b normally abuts against the lower end of the duct 22 thereby sealing the dispensing nozzle 20. When a person using the dispenser presses downwardly upon the diaphragm 16 as shown in FIGURE 5, the projection 18 presses downwardly upon the valve member 24 at the intersection of the members 24a and 24b and lowers it sufficiently to lift the upper surface of the brace 25 slightly away from the opening at the lower end of the duct 22 and at the same time reduces the volume of the container by forcing in the diaphragm 16 and increasing the pressure therein while at the same time allowing a small amount of liquid within the container to pass out through the nozzle 20. As soon as the finger pressure is released from the top of the diaphragm 16, the valve member 24 will immediately snap back to the undeflected position of FIGURE 4 pulling in the liquid remaining in the nozzle and enough air to equalize the pressure inside the container with atmospheric pressure. The lower end of the duct is then sealed thereby preventing further flow of material through the nozzle 20. As clearly shown in FIGURE 2, the ring portion of the valve member 24 preferably has a greater inside diameter than the inside diameter of the flange 26. It will, therefore, be impossible to trap liquid above the flange 24 which, if present, could be forced out through the duct 22 as a result of an increase in the temperature and pressure of the air within the container. This provision cooperates with the sealing of the duct 22 by valve member 24 to prevent bubbling. The placement of the flange 14 can be accomplished in various ways as by means of a pair of parallel vertically disposed orientation lugs are provided integral with diaphragm 16 to fit on either side of one end of flange 24a. A pair of similar lugs 34 and 36 are provided to fit on the other end of flange 24a.

It can be seen that the valve member 24 seals the lower end of the duct 22 thereby preventing the undesired escape of liquid from the container while the container is at rest as well as immediately before or immediately after material is being dispensed. It was found that the return of the valve member 24 to the sealing position indicated in FIGURE 4 upon release of the diaphragm 16 reliably prevents surging of liquid from the nozzle 20 after pressure on the diaphragm 16 has been released. Moreover, decrease in volume of the container caused by the lowering of the diaphragm 16 by finger pressure helps to assure that material will be dispensed even though changes of barometric pressure have reduced the pressure within the container.

Refer now to FIGURE 6 which illustrates a modified form of construction for orienting the flange 24 and integral braces 24a and 24b relative to the diaphragm 16. According to the modified form of the invention, the diaphragm is provided with two circumferentially spaced outwardly extending recesses 38 (only one of which is shown) spaced 180° apart on the periphery of the diaphragm. The brace 24a is provided with outwardly extending terminal portions 39 adapted to fit within the recesses 38, in this manner reliably preventing rotation of flange 24 relative to the diaphragm 16.

It is apparent that many modifications and variations of this invention as hereinbefore set forth may be made without departing from the spirit and scope thereof. The specific embodiments described are given by way of example only and the invention is limited only by the terms of the appended claims.

I claim:
1. A drop dispensing container comprising:
 (a) a container having a top opening,
 (b) a dispensing assembly on the container, said dispensing assembly including a sleeve member with an upper inwardly extending flange secured on the container,
 (c) a manually movable flow control element comprising a flexible diaphragm having an edge held between the sleeve flange and the top of the container adjacent the opening, the diaphragm having a first position, said diaphragm having a duct at one side thereof communicating with the inside of said container, said diaphragm being otherwise imperforate at all times,
 (d) a resilient valve member comprising a thin sealing element secured between the edge of the diaphragm and the top of the container and positioned in overlapping sealing relation to the inward end of the duct,
 (e) an elongated flange member extending from the valve element centrally of said diaphragm,
 (f) said flange member having a portion positioned beneath the center of the diaphragm, the center of the diaphragm being adapted to engage said portion of the flange member when the diaphragm is depressed,
 (g) said valve member sealing said duct with the diaphragm in the first position,
 (h) the movement of said diaphragm to the second position removing the valve member from the inward end of the duct,
 (i) resilient means for returning said diaphragm to its first position, and
 (j) resilient means operatively associated with the valve means for returning it to a seated position sealing the nozzle when the diaphragm is returned to its first position whereby drops of material can be dispensed from the enclosure when the diaphragm is moved from the first to the end position.

2. A drop dispensing container comprising:
 (a) a container body having an open end at its top defined by a rim;
 (b) a manually movable, flexible diaphragm operatively sealed along its edge to the top of the container body, the diaphragm having a dispensing duct extending therethrough with its inner end terminating adjacent the open end of the container body and the diaphragm being otherwise imperforate at all times, the diaphragm having a first position;
 (c) a valve member positioned below the diaphragm and adjacent the open end of the container body, the valve member having a first position in sealing engagement with the inner end of the duct when the diaphragm is in its first position and being operatively connected to the diaphragm so that depression of the diaphragm to a second position moves the valve member away from sealing engagement with the duct;
 (d) means for returning the diaphragm to its first position upon release of the depression force; and
 (e) means for returning the valve member to its first position in sealing engagement with the duct upon release of the diaphragm.

3. The drop dispensing container defined in claim 2 wherein the diaphragm comprises resilient material which constitutes the returning means for the diaphragm.

4. A drop dispensing container comprising:
 (a) a container body having an open end at its top defined by a rim;
 (b) a diaphragm having a manually movable, thin, flexible, resilient, exteriorly convex central portion extending substantially across the open end of the container body and an outwardly extending flange operatively connected to the central portion of the diaphragm and seated upon the rim of the open end of the container body, the diaphragm having a dispensing duct extending therethrough at one side thereof with its inner end terminating adjacent the open end of the container body, and the diaphragm being otherwise imperforate at all times, the resiliency of the diaphragm holding the diaphragm in a first position;
 (c) a sleeve member secured to the container body adjacent its top and having an inwardly extending, upper peripheral flange seated on the diaphragm flange and sealing the diaphragm flange with the rim of the container body;

(d) a movable valve member positioned below and engaged by the diaphragm, the valve member having an upwardly-facing flat surface engaged in sealing relation with the inner end of the duct, the valve member being adapted to be engaged by the central portion of the diaphragm so that depression of the central portion to a second position moves the flat surface of the valve member away from sealing engagement with the duct;

(e) means for returning the diaphragm to its first position upon release of the depression force; and (f) means for returning the flat surface of the valve member to its first position in sealing engagement with the duct upon release of the diaphragm.

5. The drop dispensing container defined in claim 4 wherein the central portion of the diaphragm has a depending skirt integrally formed with its outer edge which terminates in and is integrally connected to the outwardly extending flange of the diaphragm and wherein the central portion of the diaphragm also includes a substantially centrally located depending projection adapted to engage the valve member upon depression of the central portion of the diaphragm.

6. The drop dispensing container defined in claim 4 wherein the valve member is engaged between the flange of the diaphragm and the rim of the container body and includes an integral, resilient, inwardly extending projection having a flat upwardly facing surface adapted to engage the inner end of the duct in sealing relation therewith, the valve projection being positioned below the diaphragm so that the diaphragm engages the valve projection upon depression to the diaphragm's second position.

References Cited
UNITED STATES PATENTS

| | | | |
|---|---|---|---|
| 1,942,845 | 1/1934 | Stephens | 222—209 |
| 2,053,809 | 9/1936 | Asplund | 222—422 |
| 2,556,571 | 6/1951 | Bobbs et al. | 222—501 X |
| 2,679,337 | 5/1954 | Leach | 222—568 X |
| 2,699,890 | 1/1955 | Appel et al. | 222—501 X |
| 2,894,660 | 7/1959 | Gordon | 222—501 X |
| 2,954,904 | 10/1960 | Potoczky | 222—509 X |

ROBERT B. REEVES, *Primary Examiner.*

N. L. STACK, *Assistant Examiner.*